US007634741B2

(12) United States Patent
Klein (10) Patent No.: US 7,634,741 B2
(45) Date of Patent: Dec. 15, 2009

(54) METHOD AND APPARATUS FOR MANAGING A SELECTION LIST BASED ON PREVIOUS ENTRIES

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 566 days.

(21) Appl. No.: 10/931,878

(22) Filed: Aug. 31, 2004

(65) Prior Publication Data

US 2006/0048074 A1    Mar. 2, 2006

(51) Int. Cl.
G06F 3/048    (2006.01)
(52) U.S. Cl. .................. 715/811; 715/810; 715/814; 715/816; 715/817; 715/825
(58) Field of Classification Search .......... 715/810, 715/811, 812, 813, 816, 817, 818
See application file for complete search history.

(56) References Cited

U.S. PATENT DOCUMENTS

| 5,258,909 | A * | 11/1993 | Damerau et al. ........... 715/533 |
| 5,867,162 | A * | 2/1999 | O'Leary et al. ........... 715/843 |
| 6,377,965 | B1 * | 4/2002 | Hachamovitch et al. .... 715/534 |
| 6,583,797 | B1 * | 6/2003 | Roth ........................ 715/810 |
| 6,801,190 | B1 * | 10/2004 | Robinson et al. .......... 345/173 |
| 6,829,607 | B1 * | 12/2004 | Tafoya et al. ............. 707/6 |
| 2004/0039988 | A1 * | 2/2004 | Lee et al. ............... 715/505 |
| 2004/0210844 | A1 * | 10/2004 | Pettinati et al. .......... 715/708 |
| 2005/0246661 | A1 * | 11/2005 | Klein ..................... 715/811 |
| 2006/0010104 | A1 * | 1/2006 | Pettinati et al. .......... 707/3 |

OTHER PUBLICATIONS

Goetz Graefe, Query Evaluation Techniques for Large Databases, Jun. 1993, ACM Computing Surveys, vol. 25, 5, pp. 98-102.*
W. B. Cavnar. "N-gram-based text filtering for TREC-2." *Proceedings of TREC-2: Text Retrieval Conference 2*, Donna Harman, ed. National Bureau of Standards, Aug. 1993.
R. C. Angell, G. E. Freund and P. Willett. "Automatic spelling correction using trigram similarity measure." *Information Processing and Management* 19(4): 255-261, 1983.
J. R. Ullmann, "Binary n-gram technique for automatic correction of substitution, deletion, insertion, and reversal errors in words." *Computer Journal* 20(2): 141-147, May 1977.
E. Brill and R. C. Moore. "An Improved Error Model for Noisy Channel Spelling Correction." In *Proceedings, 38th Annual Meeting of the Association for Computational Linguistics*, Hong Kong: 286-293, 2000.

* cited by examiner

*Primary Examiner*—Kieu Vu
*Assistant Examiner*—Yongjia Pan
(74) *Attorney, Agent, or Firm*—Kenyon & Kenyon LLP (57) ABSTRACT

A computer implemented method and apparatus for managing a selection list include accessing previous entries in the history log for a particular field and displaying such entries in a selection list pull-down menu. A determination is made whether the selection is related to other recently made selections. Items from the selection list that are considered to be incorrect may be automatically deleted.

26 Claims, 10 Drawing Sheets

| INPUT STRING | TIME STAMP |
|---|---|
| Peter Andersen | 20040628103101 |
| Peter Anderson | 20040624092901 |
| Peter Maier | 20040628114005 |
| Peter Miaer | 20040628114002 |
| Perry White | 20030401142123 |

METHOD AND APPARATUS FOR MANAGING A SELECTION LIST BASED ON PREVIOUS ENTRIES

BACKGROUND

1. Field of the Invention

The present invention generally relates to computer generated lists, and more particularly to the selection of list items from a menu displayed on a computer display.

2. Description of the Related Art

Most current human-computer interfaces for personal computers or workstations (such as a PC desktop or Power Mac® G5) offer users a graphical user interface (GUI). A GUI typically runs on an operating system (e.g., Windows® XP, Mac OS® X, or GNU/Linux) and allows users to easily interact with the computer using tools such as a keyboard, mouse, or trackball. However, with an increasing number of programs, documents, and data available to users, GUI designers strive to provide users with simple, accurate methods for selection from a list of alternatives.

GUI's today, such as Windows® XP, attempt to be helpful by remembering users' past interactions with the GUI. For example, GUI's can display, in a pull-down list, the most recently accessed documents and programs. Users can make a selection from the list, such as by using a mouse or cursor keys, and then continue with their work. Furthermore, in certain programs, such as Microsoft Internet Explorer® 6, the GUI automatically displays to users previously visited websites as well as previously made entries for fields associated with particular forms. As another example, a GUI from SAP of Waldorf, Germany ("SAPGUI") automatically displays previous entries for particular fields. The need for a user to enter or recall the full entry associated with a particular field can be eliminated if the same entry had already been previously made.

Figure 1:
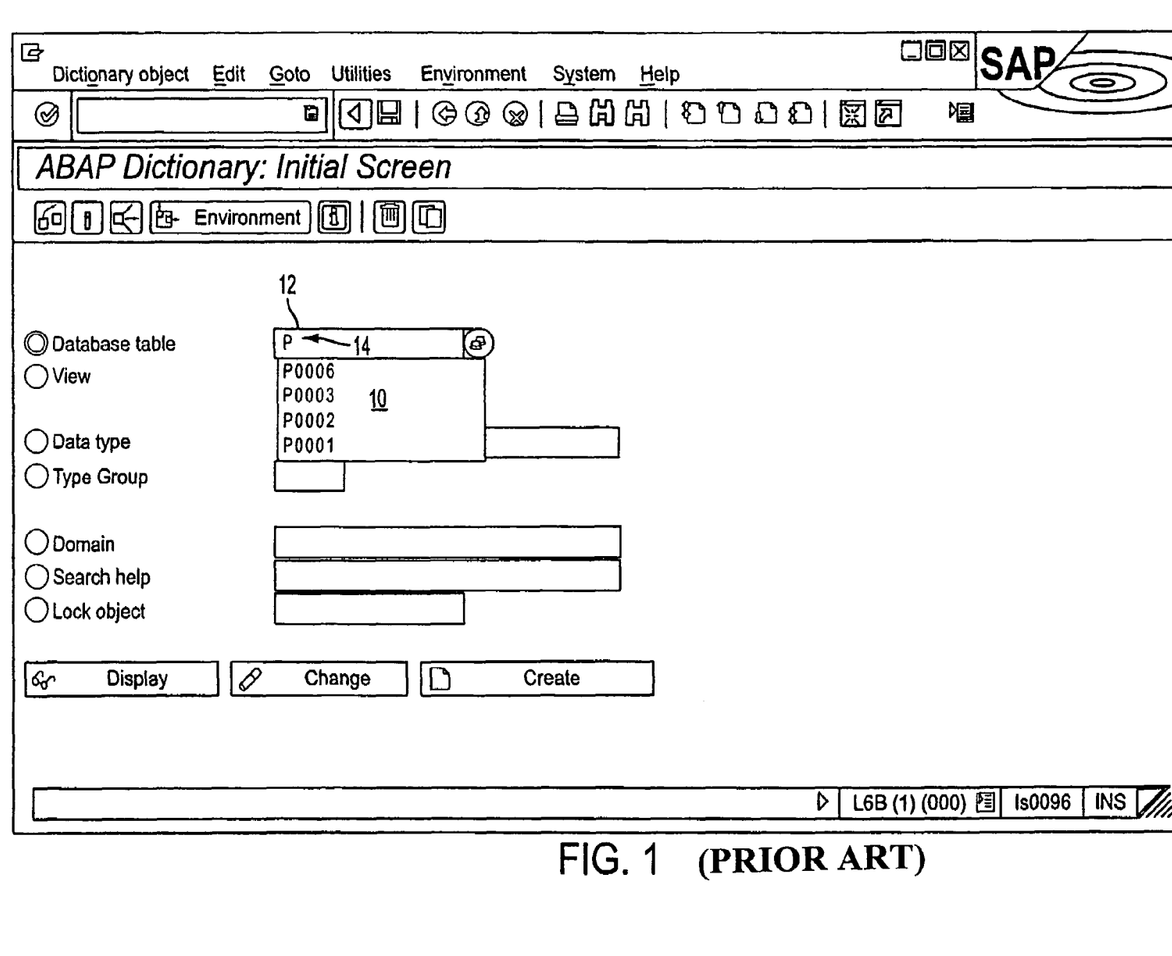
FIG. 1 is a screen shot of a pull-down menu with a sample listing of matching previous entries.

Again using the SAPGUI as an example, a selection list 10 in the SAPGUI displays a historical list of previous entries for the "Database table" field 12 in a pull-down menu as seen in FIG. 1. The selection list 10 is limited by only displaying previous entries with the same prefix as to what is being entered by the user: e.g., "P" 14 in this case. Entries are listed by placing most recently used entries prior to older entries for that particular field.

Figure 2:
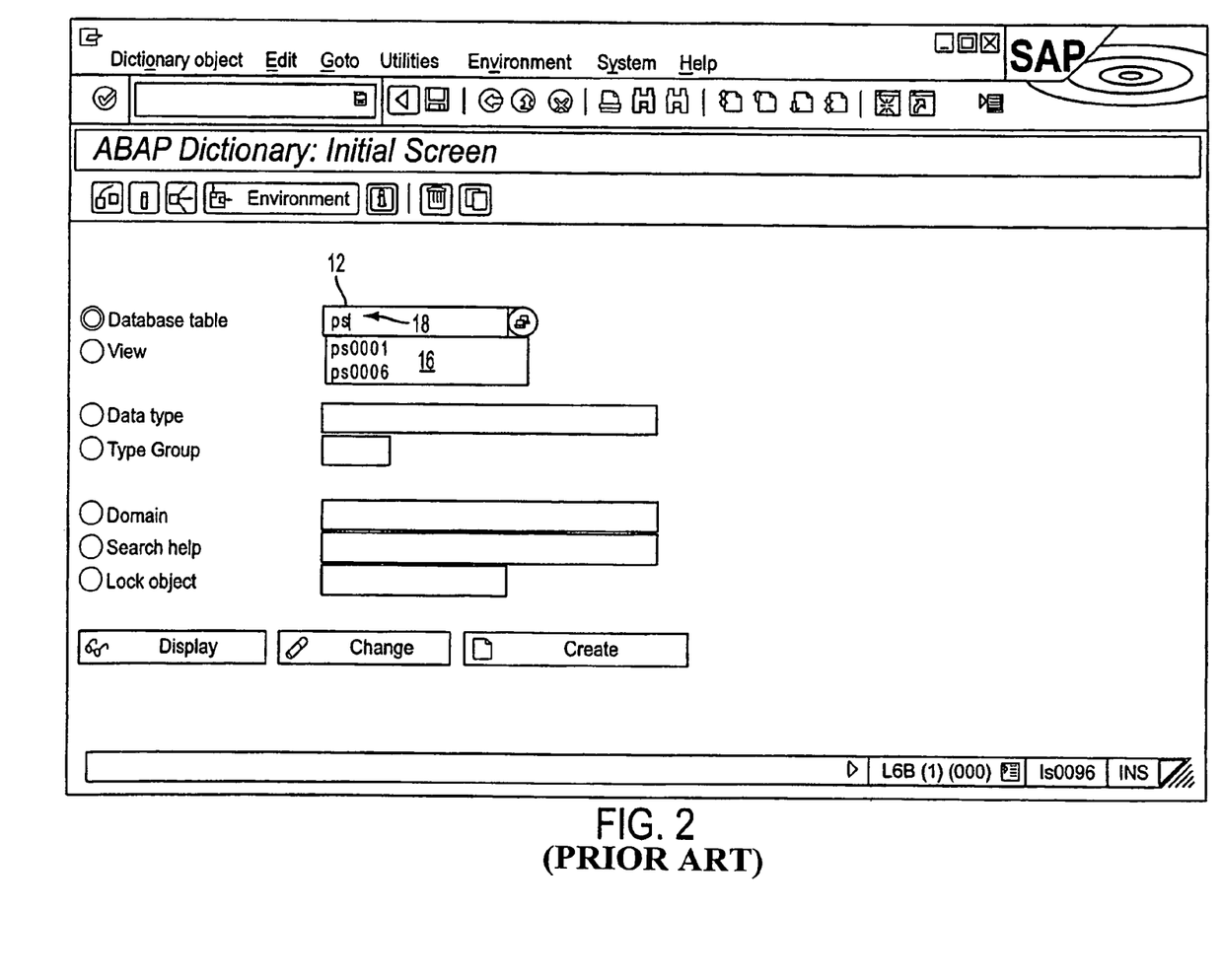
FIG. 2 is a screen shot of a pull-down menu with a sample listing of matching previous entries further limited by the user's additional entry.

In FIG. 2, a selection list 16 in the SAPGUI displays a historical list of previous entries for the "Database table" field 12. This selection list 16 is further limited by only displaying previous entries with the same prefix as to what is being entered by the user: "ps" 18 in this case. Entries, again, are listed by placing most recently used entries prior to older entries for that particular field.

Figure 3:
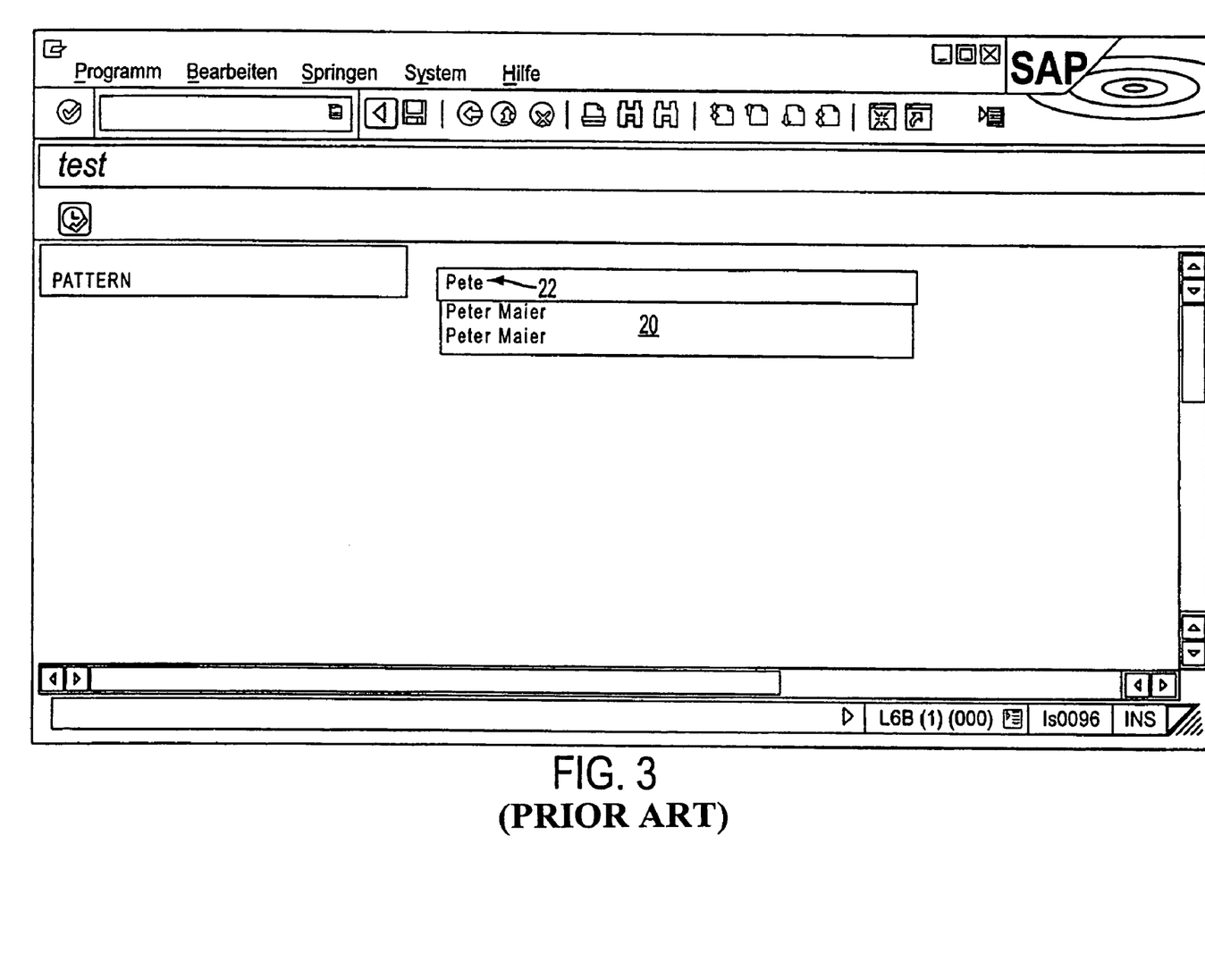
FIG. 3 is a screen shot of a pull-down menu with a sample listing of matching previous name entries limited by the user's entry.
Figure 4:
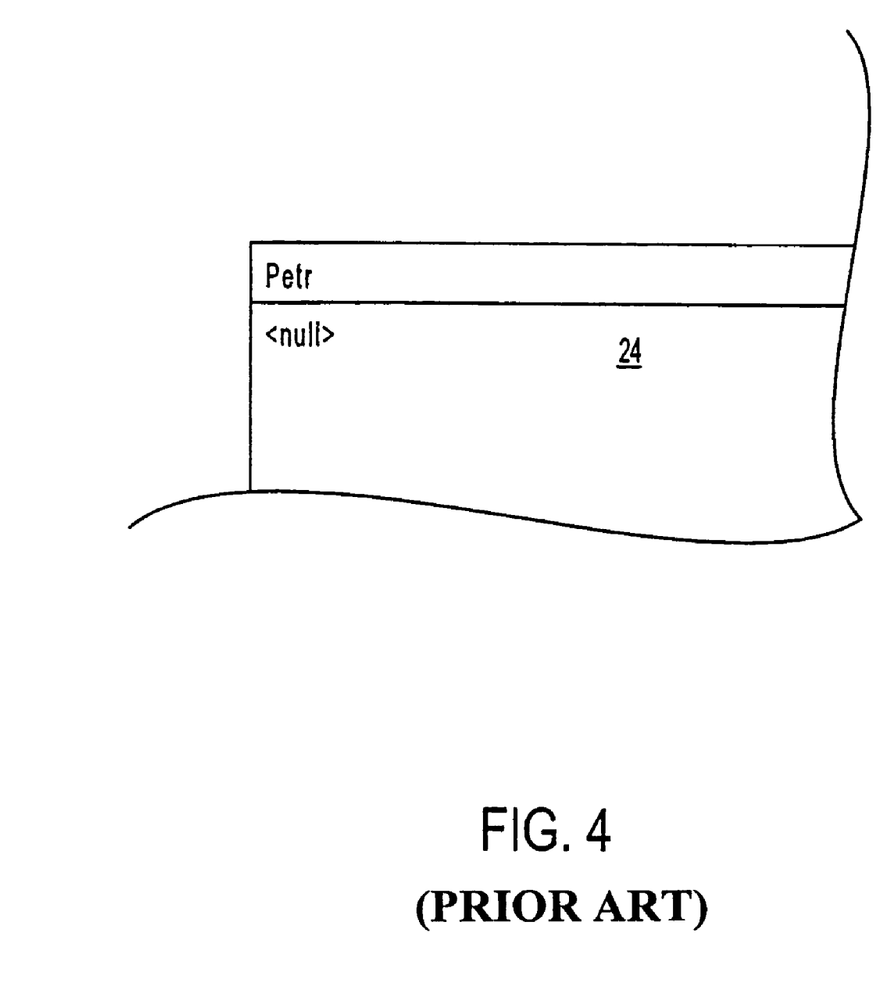
FIG. 4 is a sample pull-down display part of the screen display from FIG. 9 with no matching previous entries.

In FIG. 3, a selection list 20 in the SAPGUI displays a historical list of previous entries for names with the same prefix as what is being entered (i.e., "Pete" 22) for a particular field. Entries are listed by placing most recently used entries prior to older entries for that particular field. Finally, in FIG. 4, the SAPGUI displays no selection list 24 for a particular field. Because no previous entries match what is being newly entered, no previous entries will be displayed in the selection list for that particular field.

Figure 5:
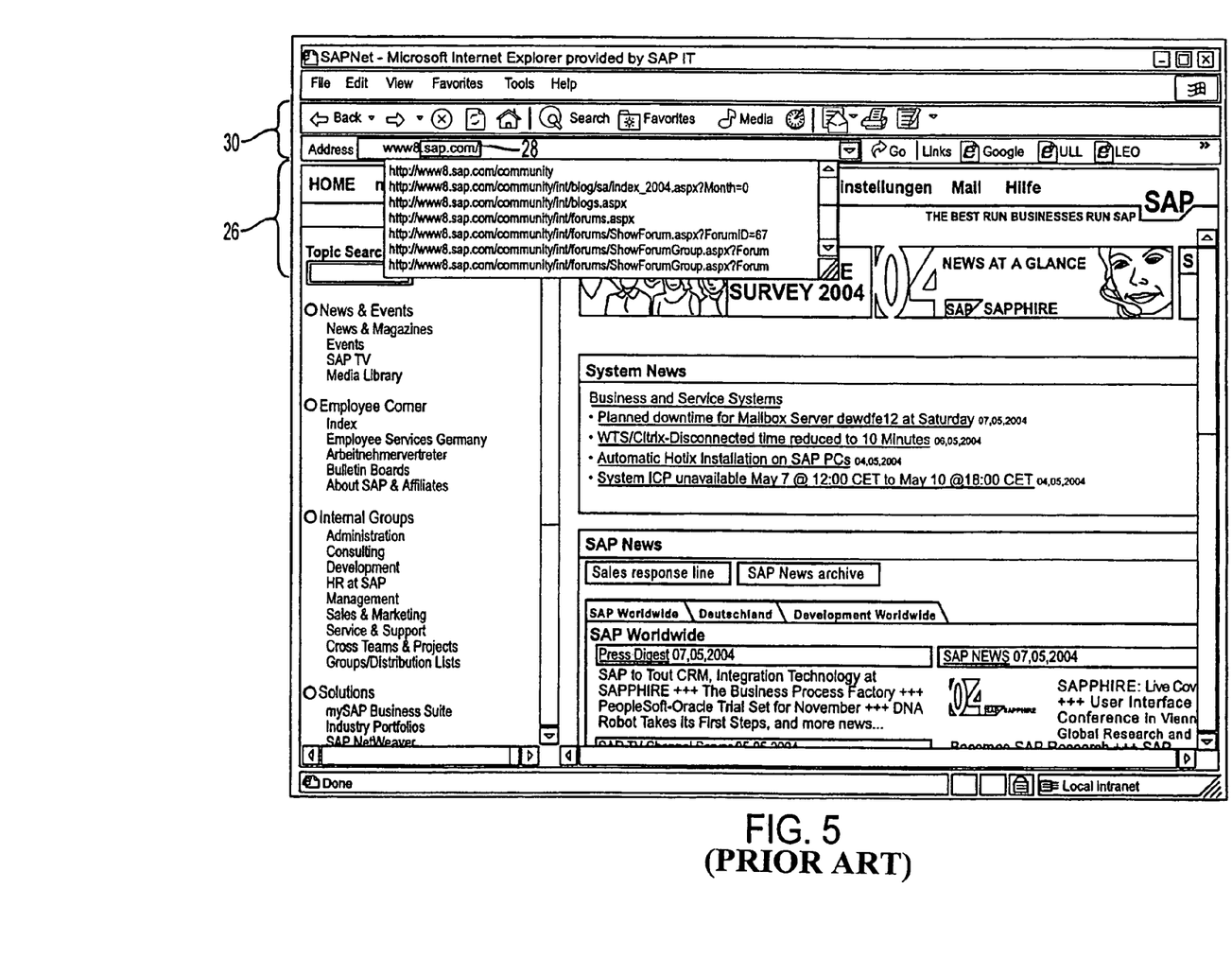
FIG. 5 is a screen shot of a prior art displaying a pull-down menu listing matching historical entries of a prior user.

Microsoft Internet Explorer®, as illustrated in FIG. 5, displays another form of how entries made by users can be displayed in a selection list 26. The Microsoft Internet Explorer® GUI displays a historical list of previously visited websites with the same prefix 28 as what is being entered by a user in the "Address" field 30. However, unlike the SAPGUI where entries are listed by placing most recently used entries prior to older entries for that particular field, entries in Microsoft Internet Explorer® are displayed in alphabetical-numerical order.

A problem that frequently arises is that the system stores and displays all previous entries matching what is being entered without regard as to whether the previous entries are correct. For example, in systems of related art, when a user inputs an entry beginning with a "P," all previously stored entries prefixed with a "P" will be displayed alphabetically and/or numerically in the selection list, even if they were incorrectly entered (e.g., misspelled). Furthermore, incorrect entries may appear first in the selection list leading the user to potentially select the incorrect entry.

Though not all systems allow users to manually delete incorrect entries from the historical file, some systems do. In the systems that do allow for manual deletion, deletion is typically only available to advanced users. Even then, manual deletion by the advanced users often requires multiple steps that could easily lead to user-error.

Another solution to delete incorrect entries is by automated deletion triggered when a history log reaches a threshold memory size. For example, the system may delete entries beginning with the oldest entries. As a result, entries that are unused or have not been used for a certain period will typically be deleted. However, correct entries may also be deleted simply based on their age or the size of the history log and not based on their correctness.

A more desirable solution would be a system that could determine the correctness of the entries and preferably automatically delete entries with a high probability of being incorrect.

SUMMARY

Embodiments of the present invention are directed to methods, systems, and computer readable media that satisfy the need for determining the correctness of entries in a selection list and preferably automatically deleting entries with a high probability of being incorrect.

One aspect of the present invention relates to a computer implemented method. This method includes accessing previous entries whose prefixes match the input of a user for a particular field, e.g., website addresses or peoples' names. These previous entries are then displayed in a pull-down menu, and the method next detects what the user selects from the pull-down menu. Still further, the method determines whether the selection made matches other previous selections within a certain period of time; and, if meeting that criterion, then deleting any previous selections that are similar to the selected item. These deleted items are those which are considered by the system as being "incorrect."

Another aspect of the present invention relates to a computer system including a display and a human user interface coupled to a computer system. Among other things, the computer system allows for displaying a pull-down list to a user, containing previous entries whose prefix matches the input of a user for that particular field. The computer system has the means then to display the selection made by the user from that list and to determine whether the selection made matches other previous selections within a certain period of time. If there is a similar match, the system has the means for removing any previous selection that is similar to the selected item. Again, these deleted items are those which are considered by the system as being "incorrect."

According to a further aspect of the present invention, a computer readable media including code segments performs the above-described computer implemented method for managing a selection list, containing alternatives of previously made entries for a particular field.

An advantage of the various aspects and embodiments of the present invention is that users will be provided preferably with selection lists containing only previously made entries that are correct (e.g., not misspelled).

The foregoing and other advantages and features of the present invention will no doubt become apparent to those skilled in the art upon reading the following descriptions and a study of the several figures of the drawings below.

DETAILED DESCRIPTION

In the following description, for purposes of explanation, rather than limitation, specific details are set forth as the particular architecture, interfaces, techniques, etc., in order to provide a thorough understanding of the present invention. However, it will be apparent to those skilled in the art that the present invention may be practiced in other embodiments, which depart from these specific details. Moreover, for the purposes of clarity, detailed descriptions of well-known devices, circuits, and methods are omitted as to not obscure the description of the present invention with unnecessary detail.

FIGS. 1-5 were discussed with respect to the related art.

Figure 6A:
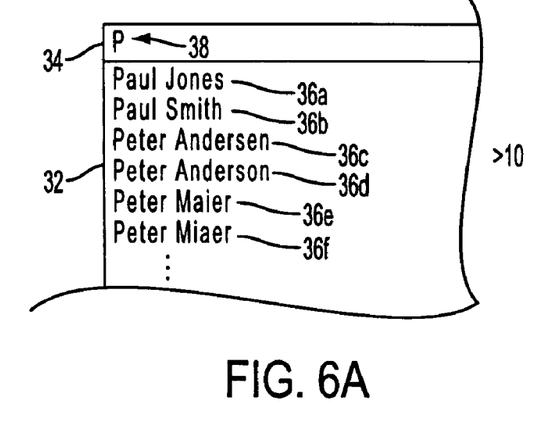
FIG. 6A is a pull-down display part of the screen display from FIG. 9 with more than ten matching previous entries.
Figure 6B:
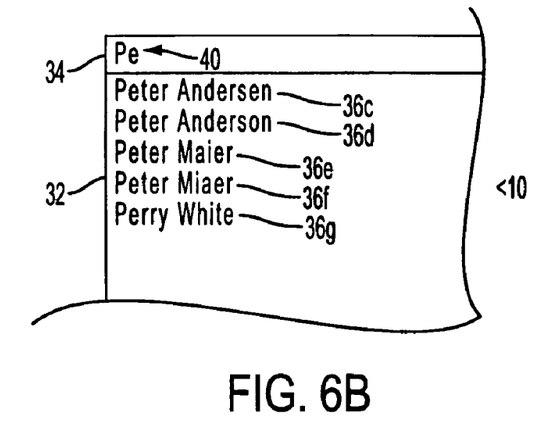
FIG. 6B is a pull-down display part of the screen display from FIG. 9 with less than ten matching previous entries.
Figure 6C:
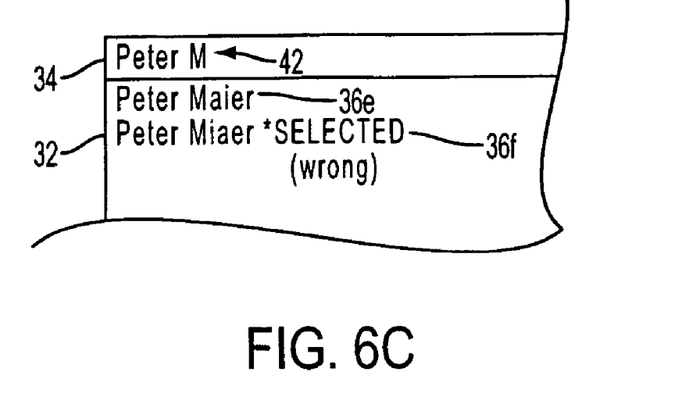
FIG. 6C is a pull-down display part of the screen display from FIG. 9 with a wrongly selected listing from matching previous entries.

FIGS. 6A-6E provide illustrative examples of the operation of an embodiment of the present invention. Referring first to FIG. 6A, when a user inputs "P" 38 into the input field 34, a pull-down display 32 part of the screen display 70 from FIG. 9 lists more than ten matching previous entries from a history log for that particular field. The pull-down display 32 contains a selection list consisting of all past entries that begin with the prefix "P" 38 as entered in the input field 34 by the user. However, unknown to the user, the list contains one typographical error: "Peter Miaer" 36f is a misspelled entry previously made by a user that should be "Peter Maier" 36e. Though the present invention could proceed when there are ten or more matching previous entries, an embodiment of the present invention would not function until there are less than ten matching previous entries as seen in FIGS. 6B and 6C. The use of ten matching previous entries as an example threshold number of entries listed is somewhat arbitrary; more or less than ten matching entries can be listed for embodiments of the present invention to function.

Figure 9:
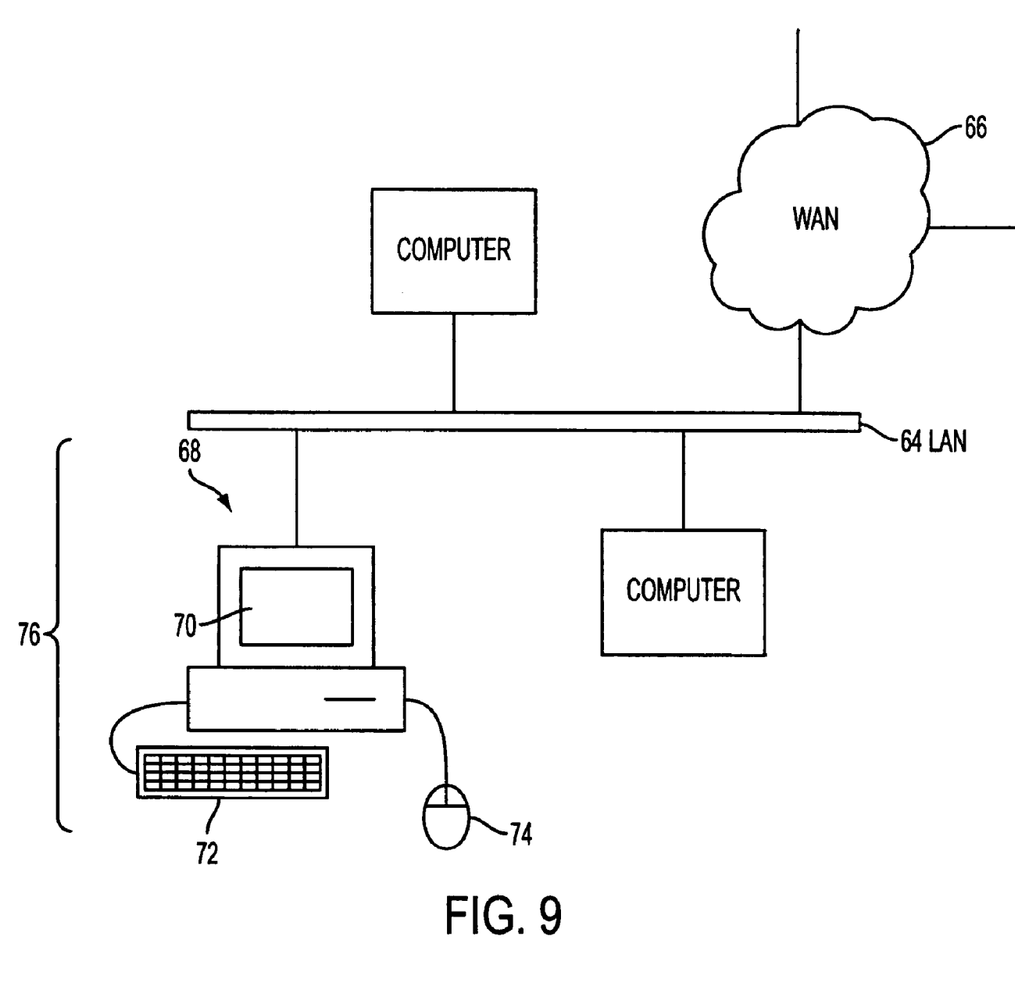
FIG. 9 is a block diagram of a computer network illustrating a network with a computer system and display in accordance with embodiments of the present invention.

FIG. 6B is an embodiment of the present invention in which a pull-down display 32 part of the screen display 70 from FIG. 9 lists less than ten matching previous entries from a history log for that particular field. There are, for example, less than ten matching previous entries because the selection list has been further limited by user input. The user has now entered "Pe" 40 in the input field 34 rather than just "P" 38 as entered in FIG. 6A. Therefore, the pull-down display 32 now contains a selection list consisting of only past entries that begin with the prefix "Pe" 40. Again, unknown to the user, the list also contains a typographical error where "Peter Miaer" 36f is a misspelled entry previously made by a prior user that should be "Peter Maier" 36e. The user could then make their selection of a previous entry, whether correct or incorrect. From the user's interactions, the system will determine whether or not listed entries are incorrect and should be deleted.

In FIG. 6C, a pull-down display 32 part of the screen display 70 from FIG. 9 lists matching previous entries to the prefix "Peter M" 42. Like FIG. 6B, this embodiment of the present invention only has less than ten previous entries available; only two previous entries match the prefix "Peter M" 42. Here, the user has further limited the selection list displayed in the pull-down display 32 by entering "Peter M" 42, rather than just "Pe" 38 as entered in FIG. 6B. Again, unknown to the user, the list also contains a typographical error where "Peter Miaer" 36f is a misspelled entry previously made by a prior user that should be "Peter Maier" 36e. Even so, the user mistakenly chooses "Peter Miaer" 36f from the selection list, and the system then detects this selection.

Figure 6D:
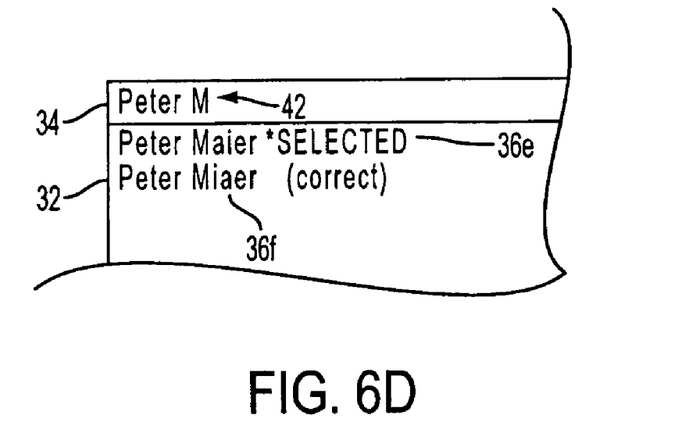
FIG. 6D is a pull-down display part of the screen display from FIG. 9 with a correctly selected listing from matching previous entries.

However, in this example, the user realizes that the selection made is wrong and has a typographical error. Within a short period of time, the user abandons the incorrect selection and returns to the input field 34 to re-enter "Peter M" 42 as seen in FIG. 6D, a pull-down display part of the screen display 70 from FIG. 9. The same selection list as in FIG. 6C will be presented in the pull-down display 32 of FIG. 6D. But this time, realizing the previous error, the user correctly selects "Peter Maier" 36e. Given that the user selects a new entry from the selection list within a relatively short period of time and that is also similar to the previous selection, the system automatically determines that the first selection made, "Peter Miaer" 36f, was incorrect (i.e., misspelled). It can therefore be assumed that that saved entry is a typographical error when the user does not continue to work with a particular entry and instead quickly goes back to select another entry similar to the prior selection.

Figure 6E:
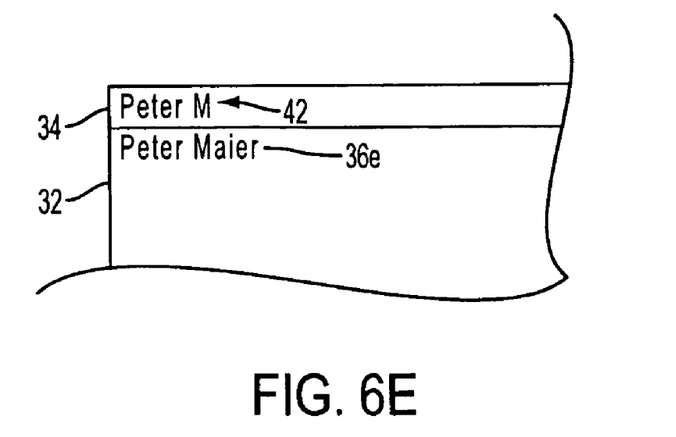
FIG. 6E is a pull-down display part of the screen display from FIG. 9 listing only the correct previous entry in accordance with embodiments of the present invention.

In FIG. 6E, a pull-down display 32 part of the screen display 70 from FIG. 9 lists only the correct previous entry, "Peter Maier" 36e, in accordance with embodiments of the present invention. Because the system determines that "Peter Miaer" 36f is an incorrect entry by the user's previous interactions, the system deletes "Peter Miaer" 36f (displayed in FIGS. 6A-6D) from the selection list in the pull down display 32. "Peter Miaer" 36f is considered to be a typographical error based on the time that the user spent on a particular selection and the similarity of that selection to the subsequent selection that is actually used.

Figure 7:
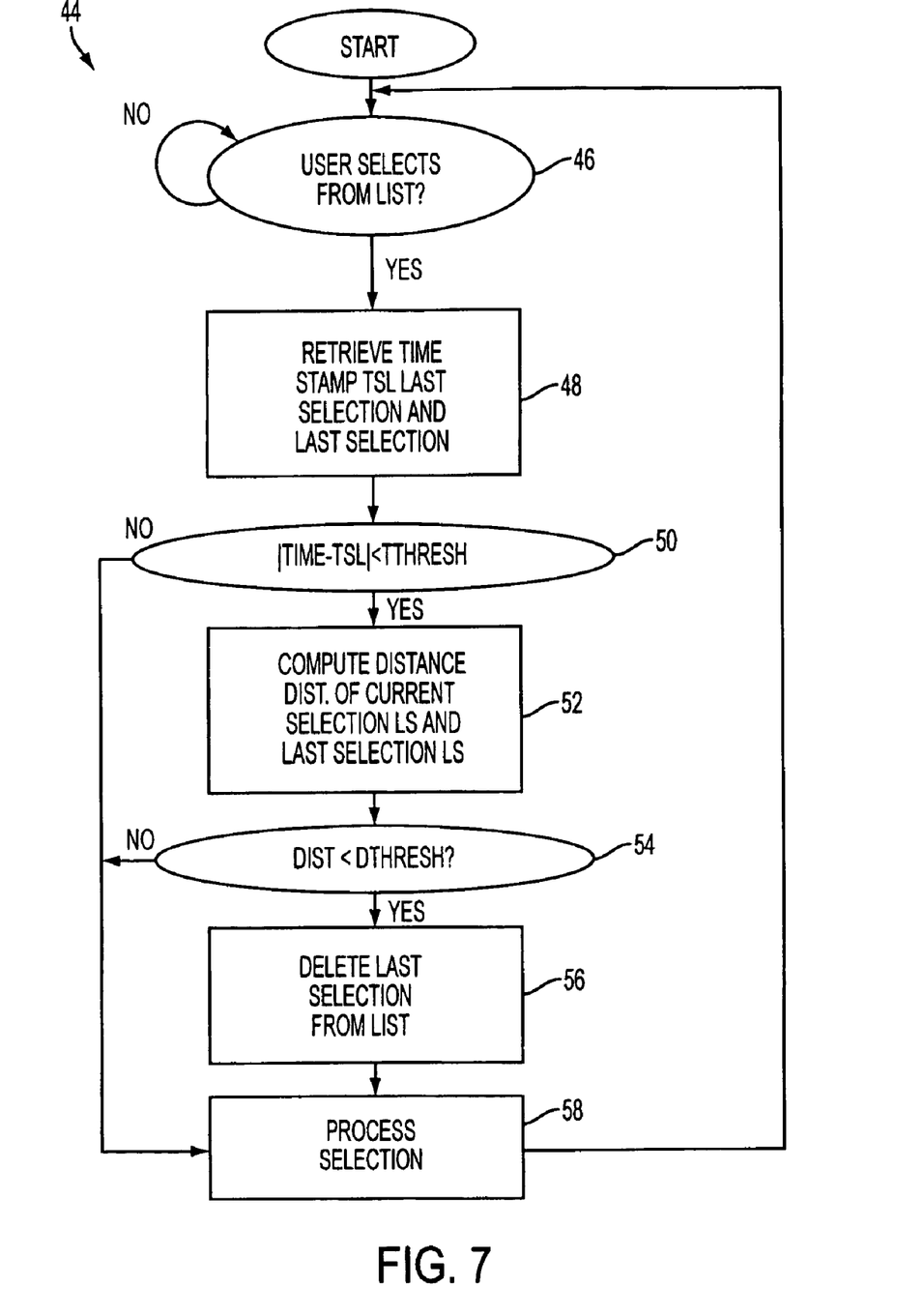
FIG. 7 is a flow diagram illustrating the operations for managing a selection list in accordance with an embodiment of the present invention.

FIG. 7 is a flow diagram 44 illustrating the operations for managing a selection list in accordance with an embodiment of the present invention. The functionality of the flow diagram 44 can be, for example, implemented as a computer program. Computer programs are stored in memory of a computer system, although they may be stored elsewhere. Such computer programs, when executed, enable the computer system to perform the function of the present invention as discussed herein. The rectangular elements generally indicate computer software acts, whereas the oval-shaped elements represent computer software decisions that affect the execution flow of the computer program. The flow diagram does not depict the syntax of any particular programming language. Rather, the flow diagram illustrates the functional information that one of ordinary skill in the art requires to fabricate circuits or generate computer software to perform the processing required of the particular apparatus.

In FIG. 7, an operation 46 waits for a user selection from a list. Once a user selection is detected, an operation 48 retrieves the last selection and the time stamp for the last selection. An operation 50 then calculates the difference between when the current selection is made and the time stamp for the last selection. If the time stamp difference between when the current selection is made and the time stamp for the last selection is greater than the threshold time set, then an operation 58 processes the chosen selection. The system assumes that there is no relationship between two consecutive selections if those selections are made separately over a long period of time. Therefore, the threshold time is typically small (e.g., about one minute or less) in embodiments of the present invention.

On the other hand, if the time stamp difference between when the current selection is made and the time stamp for the last selection is less than the threshold time set, an operation 52 calculates similarity distance between the current selection and that of the last selection. The similarity distance calculation is numerically based and used to determine whether distance is less than that of a specified distance threshold, which is typically large in embodiments of the present invention. Calculation of the similarity distance can be determined using various formulas (e.g., n-grams and/or Damerau-Levenshtein algorithm). Such formulas may calculate the similarity of words or input strings by prediction (e.g., probability of the words being the same) and/or determination of the differences in distance of the differing letters in the words or input strings (e.g., reversal of, substituted, or missing letters).

As well known to those skilled in the art, N-grams is a statistical method that can be applied to computational linguistics in predicting the similarity of words. For example, the probability of similarity can be determined by comparing two words and determining how different the two words are by looking back one letter to trying to predict the next letter (bigram model) or probability determined by looking two letters back to try to predict the next letter (trigram model). W. B. Cavnar. "N-gram-based text filtering for TREC-2." *Proceedings of TREC-2: Text Retrieval Conference* 2, Donna Harman, ed. National Bureau of Standards, August 1993; R. C. Angell, G. E. Freund and P. Willett. "Automatic spelling correction using trigram similarity measure." *Information Processing and Management* 19(4): 255-261, 1983; J. R. Ullmann, "Binary n-gram technique for automatic correction of substitution, deletion, insertion, and reversal errors in words." *Computer Journal* 20(2): 141-147, May, 1977. On the other hand, the Damerau-Levenshtein algorithm is a method that calculates distance where distance between two strings is the minimum number of single character insertions, substitutions, and deletions and/or character pair transpositions necessary to derive a string from another. E. Brill and R. C. Moore. "An Improved Error Model for Noisy Channel Spelling Correction." In *Proceedings, 38th Annual Meeting of the Association for Computational Linguistics,* Hong Kong: 286-293, 2000.

Returning to the example, an operation 54 then calculates the distance between the current selection and that of the last selection. If the distance between the current selection and that of the last selection is greater than the threshold distance, then an operation 58 processes the chosen selection. The system assumes that, if there is a large distance between the words or input strings, then the words or input strings are dissimilar. On the other hand, if the distance between the current selection and that of the last selection is less than the threshold distance, an operation 56 will first delete the last selection from the history log/list before an operation 58 processes the chosen selection. The system here assumes that the words or input strings are similar because they have a short distance between each other (e.g., differing by one letter).

Figure 8:
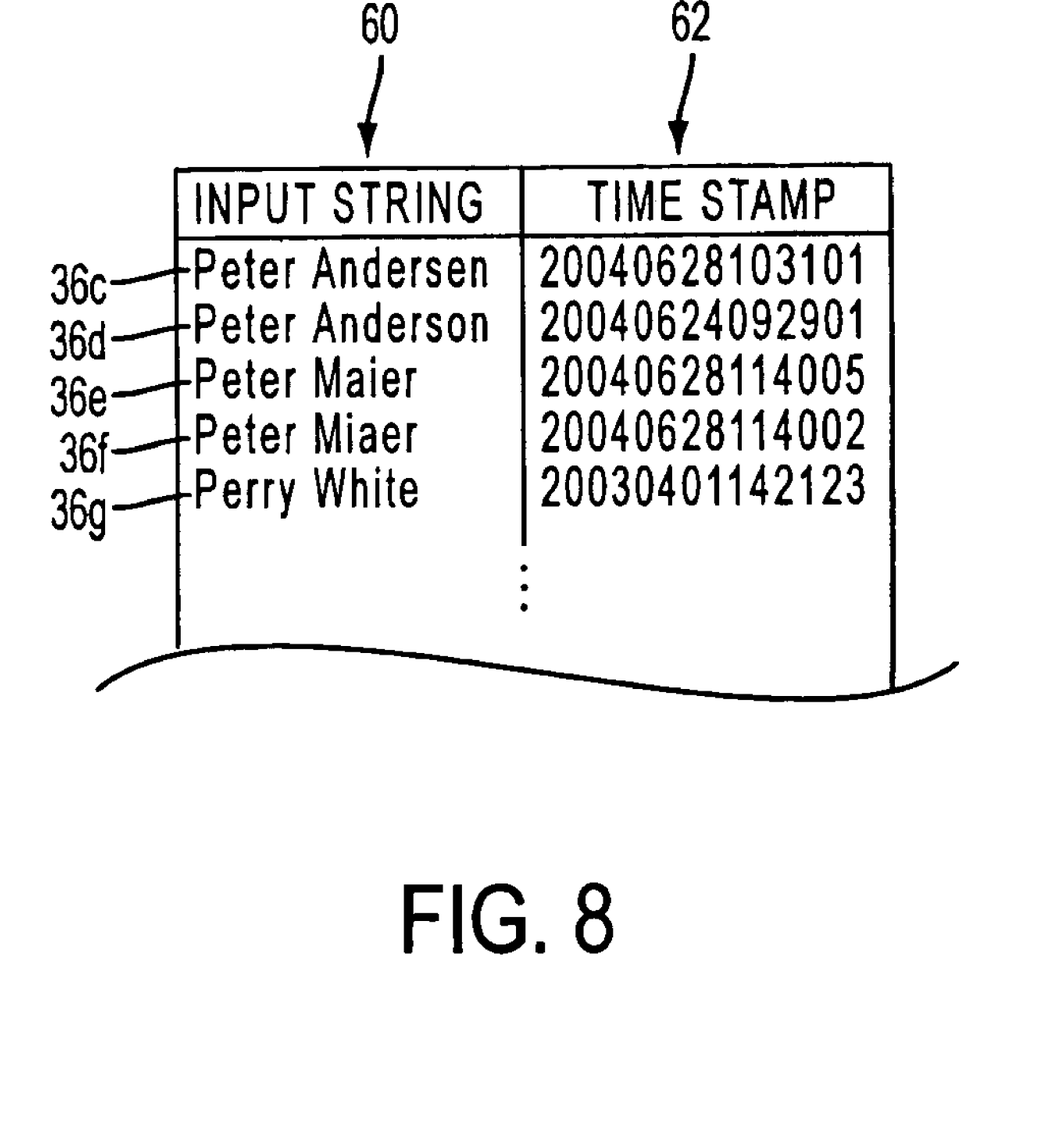
FIG. 8 is a diagrammatic representation of a sample input string data and their respective time stamps from a history log in accordance with an embodiment of the present invention.

FIG. 8 is a diagrammatic representation of a sample input string data 60 and their respective time stamps 62 from a history log in accordance with the present invention. Here, referring back to FIGS. 6C-6E, the time stamps of "Peter Maier" 36e and "Peter Miaer" 36f differ by only 3 seconds, where "Peter Miaer" 36f was first chosen incorrectly. Given the operations outlined in the flow chart of FIG. 7, the time stamp difference between when the current selection was made and the time stamp for the last selection would be less than the threshold time set, if the threshold time was set to about one minute (or even 10 seconds) or less. An operation 54 from FIG. 7 would then next determine if the distance between the current selection and that of the last selection is less than the threshold distance. Because Peter Maier" 36e and "Peter Miaer" 36f are similar and only differ by a reversal of an "a" and an "i" (e.g., short distance in comparing the spelling of the two last names), "Peter Miaer" 36f would then be deleted from the history log.

FIG. 9 is a block diagram of a computer network illustrating a network with a computer system and display in accordance with embodiments of the present invention. Software can be installed and stored locally via a Java applet or local drive or remotely via local area network (LAN) 64, wide area network (WAN) 66, or servers. Software is operated by a computer system 68 running on an OS, such as Windows® XP, Mac OS® X, and having a display, such as a LCD flat-panel monitor or desktop tube monitor screen display 70, and tools, such as a keyboard 72, mouse 74, and/or trackball. Typically, a user working on a computer workstation 76 will type on the keyboard 72 to enter data into a data field displayed on the screen display 70 a previous entry. According to an embodiment of the present invention, as the user types the data, the user will be presented with a selection list containing previous entries retrieved from data stored elsewhere, such as somewhere on the WAN 66 or the computer workstation 76 itself. The user than can use the mouse 74 to make a selection from the selection list displayed on the screen display 70. After the selection is made, the computer workstation 76 processes the data locally or elsewhere, such as through servers via the WAN 66.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A computer implemented method for managing a selection list comprising:
   accessing an item collection including a plurality of items;
   displaying a selection list for a user that is derived from said item collection;
   identifying a selected item of said selection list;
   assigning a time stamp to said identified selected item;
   identifying a set of other items of said selection list that were previously selected within a pre-determined time period prior to said time stamp;
   identifying an item in said set of other items that is textually similar but not identical to the selected item; and
   deleting said textually similar item from said item collection.

2. A computer implemented method for managing a selection list in accordance with claim 1 wherein displaying said selection list includes creating a subset of items derived from said item collection.

3. A computer implemented method for managing a selection list in accordance with claim 2 wherein creating a subset of items includes:
   obtaining an input string from a user; and
   selecting items from said item collection which correlate with said input string.

4. A computer implemented method for managing a selection list in accordance with claim 3 wherein said selection list changes as said input string changes.

5. A computer implemented method for managing a selection list in accordance with claim 1 wherein said pre-determined time period is less than about one minute.

6. A computer implemented method for managing a selection list in accordance with claim 5 wherein said pre-determined time period is less than about 30 seconds.

7. A computer implemented method for managing a selection list in accordance with claim 6 wherein said pre-determined time period is less than about 10 seconds.

8. A computer implemented method for managing a selection list in accordance with claim 1 wherein similarity is used to detect erroneous item entries to the item collection that are textually similar.

9. A computer implemented method for managing a selection list in accordance with claim 8 wherein similarity is determined by a numerical analysis comparing said selected item and said any item from said set of other items.

10. A computer implemented method for managing a selection list in accordance with claim 9 wherein said numerical analysis includes calculating a numerical distance between said selected item and said any item from said set of other items.

11. A computer implemented method for managing a selection list in accordance with claim 10 wherein said numerical distance is calculated, at least in part, using n-grams.

12. A computer implemented method for managing a selection list in accordance with claim 11 wherein said n-grams include at least one of bigrams and trigrams.

13. A computer implemented method for managing a selection list in accordance with claim 10 wherein said numerical distance is calculated, at least in part, using a Damerau-Levenshtein algorithm.

14. A computer system including a display and a human user interface coupled to said computer system for managing a selection list comprising:
   means for displaying a selection list for a user that is derived from an item collection including a plurality of items;
   means for identifying a selected item of said selection list;
   means for assigning a time stamp to said identified selected item;
   means for identifying a set of other items of said selection list that were previously selected within a predetermined time period prior to said time stamp;
   means for identifying an item in said set of other items that is textually similar to the selected item; and
   means for deleting said textually similar item from said item collection.

15. A computer system including a display and a human user interface coupled to said computer system for managing a selection list in accordance with claim 14 wherein said means for displaying said selection list includes means for creating a subset of items derived from said item collection.

16. A computer system including a display and a human user interface coupled to said computer system for managing a selection list in accordance with claim 15 wherein said means for creating a subset of items includes:
   means for obtaining an input string from a user; and
   means for selecting items from said item collection which correlate with said input string.

17. A computer system including a display and a human user interface coupled to said computer system for managing a selection list in accordance with claim 16 wherein said selection list changes as said input string changes.

18. A computer system including a display and a human user interface coupled to said computer system for managing a selection list in accordance with claim 17 wherein said means for removing includes means for performing a numerical analysis comparing said selected item and said any item from said set of other items to determine similarity.

19. A computer system including a display and a human user interface coupled to said computer system for managing a selection list in accordance with claim 18 wherein said means for performing a numerical analysis includes means for calculating a numerical distance between said selected item and said any item from said set of other items.

20. A computer program embodied on a computer readable media causing a computer to execute the steps of:
   accessing an item collection including a plurality of items;
   displaying a selection list for a user that is derived from said item collection;
   identifying a selected item of said selection list;
   assigning a time stamp to said identified selected item;
   identifying a set of other items of said selection list that were previously selected within a predetermined time period prior to said time stamp;
   identifying an item in said set of other items that is textually similar but not identical to the selected item; and
   deleting said textually similar item from said item collection.

21. A method for eliminating incorrect entries from a selection list provided for a data entry field, comprising:
   displaying a user interface to a computer operator that includes at least one text box for entry of text data;
   as text data is entered into the text box, displaying a selection list associated with the text box populated by previously-entered text items associated with the text box; and responsive to a selection of one of the text items from the selection list, identifying another item in the selection list that is textually similar but not identical to the selected text item and was selected within a given time period prior to a time of the previously-entered text items; and removing the previously-entered, textually similar item from the selection list.

22. A method for eliminating incorrect entries from a selection list, provided for a data entry field, comprising:

displaying the data entry field in a user interface, maintaining a selection list having items therein that correspond to data previously entered via the user interface, displaying, as data is being entered into the data entry field, elements of the selection list that are similar to content of the data being entered, upon completion of entry of new data into the data entry field, comparing content of the new data to content of entries in the selection list, detecting a set of items of the selection list that are similar in content to the new data, if similar items are detected, determining whether a similar but not identical item was added to the selection list within a predetermined time from a time of completion of entry of the new data, and if the similar item was added to the selection list within the predetermined time, removing the similar item from the selection list.

23. The method of claim 22, wherein the determining a set of items comprises basing the determination upon the results of the comparison of the new data to content of entries in the selection list.

24. The method of claim 22, wherein removing the similar item from the selection list comprises deleting an incorrect entry from a history log.

25. The method of claim 1, wherein deleting comprises deleting the last selection from a history log.

26. A computer implemented method for managing a selection list comprising:

accessing a history log including a plurality of entries;

displaying a first selection list for a user that is derived from said history log;

detecting a selection of an entry of said first selection list by said user to identify a first selected entry;

assigning a first time stamp to said first selected entry;

displaying a second selection list for a user that is derived from said history log;

detecting a selection of an entry of said second selection list by said user to identify a second selected entry;

assigning a second time stamp to said second selected entry;

calculating a difference between the first time stamp and the second time stamp;

calculating if the difference between the first time stamp and a second time stamp is equal to or less than a predetermined time difference;

calculating if said first selected entry is textually similar but not identical to said second selected entry; and deleting said first selected entry from said history log if the difference between the first time stamp and a second time stamp is equal to or less than a predetermined time difference and if said first selected entry is textually similar but not identical to said second selected entry.

* * * * *

UNITED STATES PATENT AND TRADEMARK OFFICE
CERTIFICATE OF CORRECTION

PATENT NO.        : 7,634,741 B2                                      Page 1 of 1
APPLICATION NO. : 10/931878
DATED             : December 15, 2009
INVENTOR(S)       : Udo Klein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Ninth Day of November, 2010

David J. Kappos
*Director of the United States Patent and Trademark Office*